Feb. 12, 1952   W. A. HUMPHREY ET AL   2,585,466
ELECTRIC TOASTER
Filed Dec. 5, 1947   2 SHEETS—SHEET 1

INVENTOR.
Warren A. Humphrey
& Otis B. Sutton
BY Harry S. Duncan
ATTORNEY.

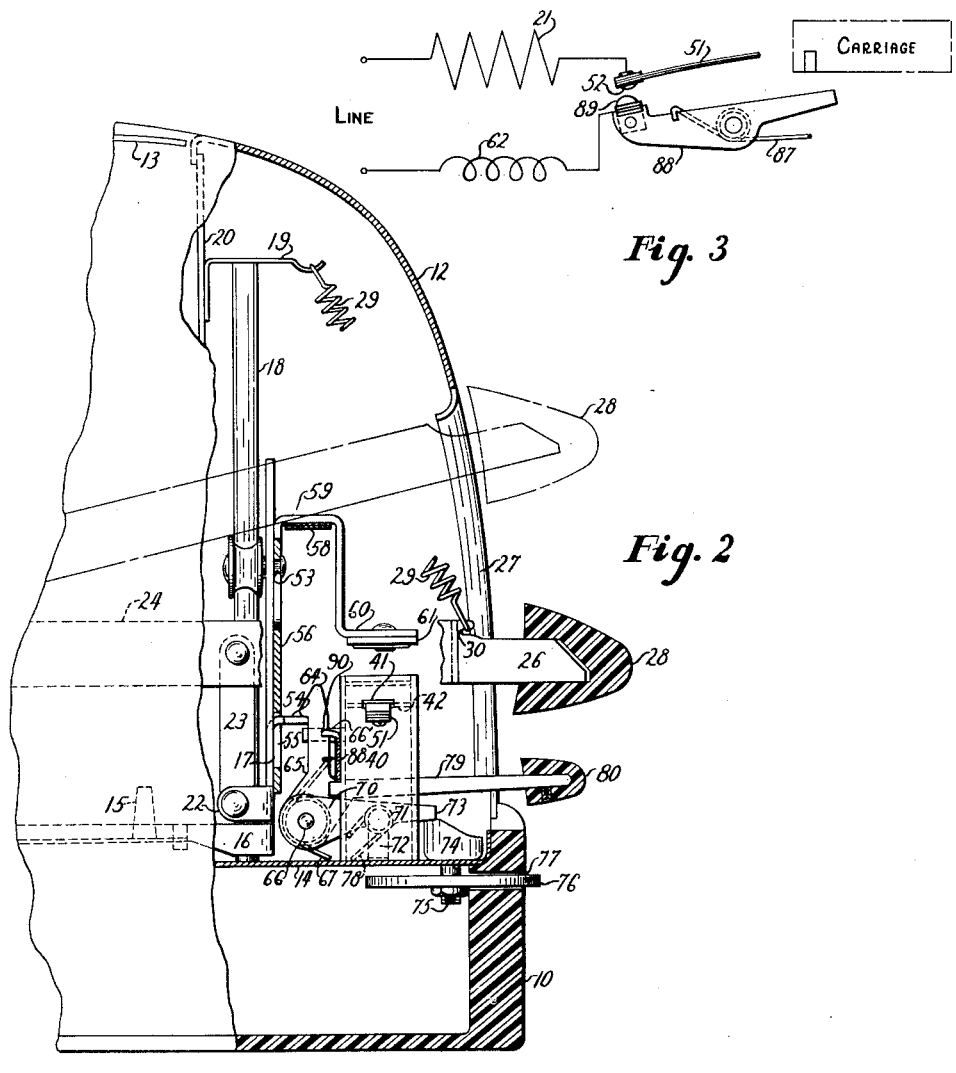

Patented Feb. 12, 1952

2,585,466

UNITED STATES PATENT OFFICE 2,585,466

ELECTRIC TOASTER

Warren A. Humphrey and Otis B. Sutton, Canton, Ohio, assignors to The Hoover Company, North Canton, Ohio, a corporation of Ohio Application December 5, 1947, Serial No. 789,870

15 Claims. (Cl. 99—329)

The present invention relates to electric bread toasters and more particularly to a thermal timing mechanism for timing the duration of the toasting intervals whereby the operator may obtain toast cooked exactly as desired.

Thermal timers inherently are self-compensating in that the timer as a whole also becomes progressively hotter for each succeeding toasting operation and accordingly shortens the toasting period for each succeeding operation. It has been found, however, that thermal timers have a tendency to over-compensate. That is, for each succeeding toasting operation, the toast is cooked progressively less and less for any particular timer setting.

This result comes about by reason of the fact that heat is stored in the parts of the thermal timer from the preceding toasting operation and as a consequence the timer becomes hotter and hotter at the start of each succeeding toasting operation. This causes the thermally responsive element of the timer to act faster and faster for each succeeding toasting operation unless some means is provided to prevent it.

According to the present invention, this difficulty is remedied by cooling the thermal timer after each toasting operation so that the succeeding toasting operation will not be initiated until the thermally responsive element of the timer is at the proper temperature to properly time the succeeding operation.

In prior devices, it has been necessary for the operator to wait until the timer has cooled before the next succeeding toasting operation can be initiated.

According to the present invention the operator can immediately insert new slices to be toasted after a prior toasting operation without waiting for the thermal timer to cool. The succeeding toasting operation will then proceed automatically without further attention from the operator.

The toaster and timer according to this invention is of the same general type as that disclosed and claimed in an application for letters patent filed by Dale C. Gerber December 31, 1946, Serial No. 719,506, and is an improvement and simplification over the timer and toaster disclosed in that application.

This invention also relates to the same general type of toaster and timer disclosed and claimed in an application for United States Letters Patent by Rowland H. Gardner, Serial No. 789,867, filed concurrently herewith and an application for United States Letters Patent by Warren A. Humphrey, Serial No. 789,869, also filed concurrently herewith. The present invention differs specifically over the other applications in that in the present invention the manual adjustment for adjusting for light, medium, or dark toast moves a pivoted latch upwardly and downwardly so as to vary the position of the toast carriers relative to the base and the position of the auxiliary heater relative to the thermal timer and in addition a thermal compensator moves the auxiliary heater relative to the carrier plate so as to additionally vary the position of the auxiliary heater relative to the thermal timer when the carriers are moved to toasting position.

Additionally, a single switch mechanism is provided which is operated by movement of the thermal timer and movement of the toast carriers to toasting position whereby the switch will remain open and the main heaters and auxiliary heater deenergized until the timer returns to its cold over-center position and the toast carriers are moved to toasting position.

Other objects and advantages of this invention will become apparent as the description proceeds when taken in connection with the accompanying drawings in which:

Figure 2 is a vertical cross-sectional view of the toaster and timer of Fig. 1;

Figure 3 is a wiring diagram showing how the parts are electrically connected; and Figure 4 is a detail view showing how the parts of the timer are arranged.

Figure 1:
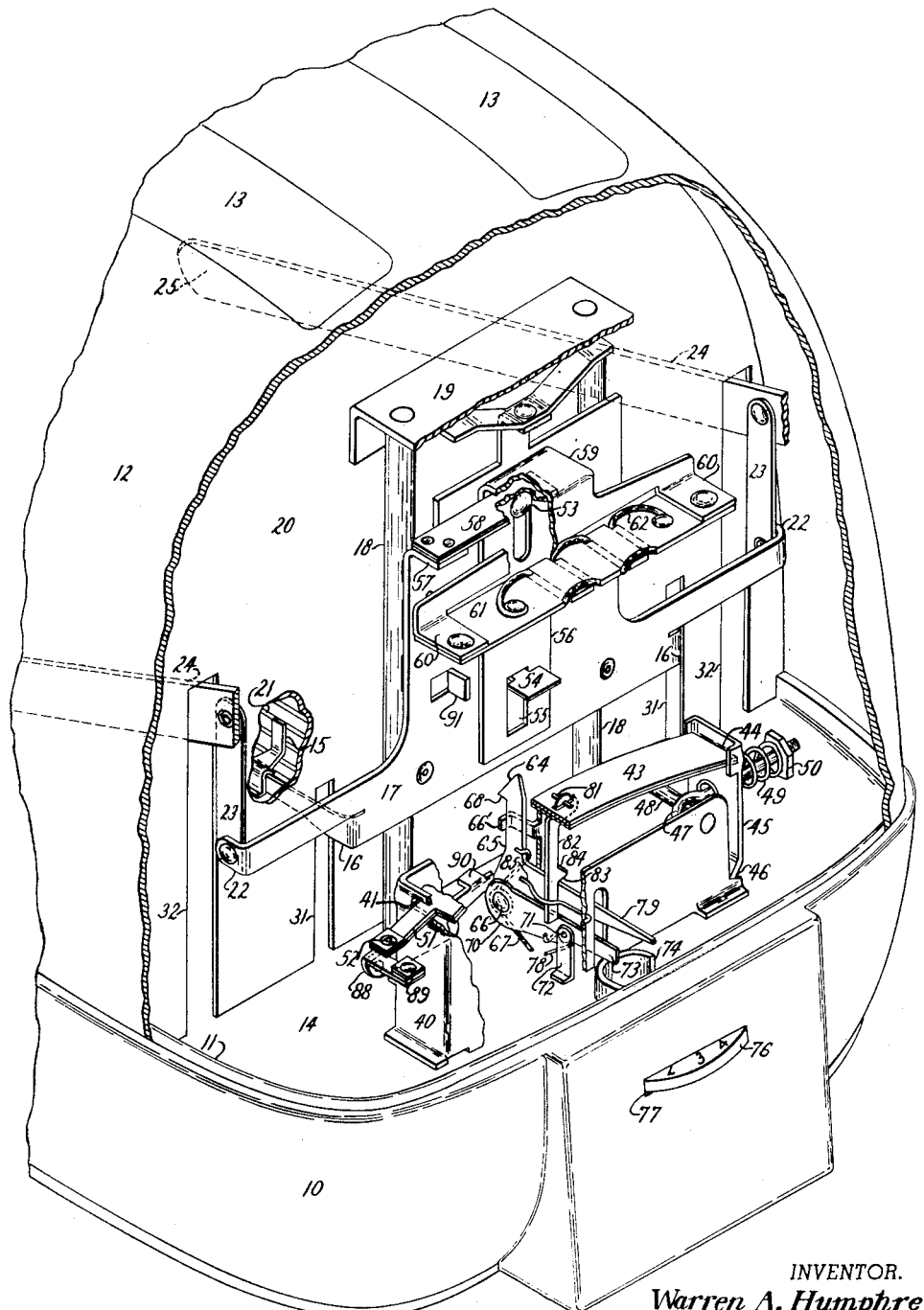
Figure 1 is a perspective view of the toaster and timer of this invention with the parts broken away to better show the details thereof.

Referring to the drawings the reference numeral 10 represents a base for the toaster made of a moldable insulating material such as hard rubber or a phenolic condensation product. Mounted within a circumferential ledge 11 of the base 10 is the lower edge of an appearance housing 12 having bread receiving slots 13 in its upper portion. Inwardly of the lower edge of the appearance housing 12 and also supported on the ledge 11 is a supporting plate 14 which supports the entire mechanism within the appearance housing 12.

Bread carriers 15 are positioned immediately below the bread receiving slots 13. The bread carriers are carried by lugs 16 extending rearwardly from a vertically reciprocating carriage plate 17, mounted for vertical reciprocation by the rods 18 in a manner well known in the art. The rods 18 are secured at their lower ends to the supporting plate 14 and at their upper ends to a bracket 19 secured to the dividing plate 20 which divides the interior of the toaster into a toasting oven and a mechanism compartment as is well known in the art.

The bread carriers 15 are spaced between spaced heating elements 21 also as is well known in the art. Extending outwardly and rearwardly from the carriage plate 17 are a pair of lugs 22 carrying pivoted links 23 which are pivoted at their upper ends to the manipulating arms 24. The manipulating arms 24 are pivoted at their rear ends to the walls of the toasting chamber as at 25 and at their forward ends 26 are extended forwardly through a slot 27 in the appearance housing 12. A manipulating handle 28 is secured to the forward extensions 26 of the arms 34.

The arms 24 and correspondingly the carriage plate 17 and the bread carriers 15 are biased to upward position by a tension spring 29 anchored in its upper end to the bracket 19 and at its lower end to the hooks 30 on the extensions 26 of the lever arms 24. The dividing plate is provided with slots 31 for the vertical reciprocation of the lugs 16 and slots 32 for the vertical reciprocation of the arms 24.

Mounted on the supporting plate 14 is an upstanding U-shaped bracket 40, having a slot 41 and a depressed bearing 42 in one end which supports one end of a bimetal timer 43, the opposite end of which is supported in a bearing 44 in the upper end of an arm 45 pivoted to the bracket 40 at 46. An eye bolt 47 is pivoted at 48 to the bracket 40 and applies a compressive force to the ends of the bimetal timer 43 by means of a compression spring 49 the pressure of which is adapted to be adjusted by a factory adjusting nut 50 threaded to the screw threaded end of the eye bolt 47. A reduced end 51 of the bimetal timer 43 extends through the slot 41 in the bracket 40 and carries an electrical contact 52 for a purpose to be presently described.

Mounted for vertical reciprocation on the carriage plate 17 by means of a rivet and slot connection 53 and a tang 54 on the carriage plate 17 which extends through a slot 55, is an auxiliary carriage 56.

Extending outwardly from the carriage plate 17 is a lug 57, to which is secured one end of a compensating bimetal 58. The free end of the compensating bimetal 58 is adapted to engage a projection 59 extending forwardly from the auxiliary carriage 56 for a purpose which will presently appear. Extending forwardly from the projection 59 are a pair of lugs 60 which carry the opposite ends of an insulating plate 61 on which is wound an auxiliary heater 62. As will presently appear the auxiliary heater 62 is positioned immediately above the timing bimetal 43 when the carriers 15 are moved to toasting position.

For latching the carriage plate 17 in downward position the tang 54 engages a cam 64 of latch lever 65 to pivot it clockwise about its pivot 66 against the bias of spring 67 until the hook 68 engages over the tang 54. A stop 66' is mounted on the bracket 40 to limit counter-clockwise movement of the latch 65 under the bias of its spring 67.

The latch arm 65 is pivoted at 66 to the end of an arm 70 which in turn is pivoted intermediate its ends at 71 to a pair of brackets 72 mounted on the supporting plate 14. The other end 73 of arm 70 engages a cam 74 supported for rotation on the supporting plate 14 by a shaft 75. A hand wheel 76 extends through an opening 77 in the front of the base 10 so that the cam 74 can be easily manipulated. The arm 70 is biased clockwise about its pivot 71 by a spring 78. The latch arm 65 has an end 79 which extends through the slot 27 in the appearance housing 12 and has a manipulating knob 80 attached thereto immediately above the hand wheel 76 so that the latch arm 65 can be released manually at the will of the operator.

Secured in an opening in the central portion of the bimetal timer 43 by a pin 81 is a latch release member 82 having a cam 83 overlying the latch arm 65. Immediately above the cam 83 is a second cam 84 for a purpose which will presently appear. The lower end of the latch release lever 82 is held against the latch arm 65 by a spring 85 for a purpose which will presently appear.

Pivoted to the bracket 40 at 86, and spring-biased counter-clockwise as viewed in figure 4 by the spring 87, is a switch arm 88 carrying a contact 89 which cooperates with the contact 52 on the end 51 of the bimetal timber 43 to energize both the main heaters 21 and the auxiliary heater 62 when the contacts are engaged. At its opposite end the arm 88 carries a lug 90 which cooperates with a lug 91 struck forwardly from the carriage plate 17 as will presently appear.

*Operation*

If the operator desires to make dark toast the hand wheel 76 will be rotated clockwise as viewed in Fig. 1 so that the lowest point of the cam 74 will be in contact with the end 73 of the arm 70. The spring 78 will pivot the arm 70 clockwise so as to raise the pivot point 66 of the latch arm 65 and accordingly raise the hook 68. The engagement of the hook 68 in its highest position over the tang 54 of the carriage plate 17 will latch the carriage plate 17 in a higher position. Accordingly, the auxiliary heater 62 will be positioned farther away from the bimetal timer 43 and the toasting period will be lengthened so as to produce dark toast.

If light toast is desired the hand wheel 76 is rotated counter-clockwise as viewed in Fig. 1 until the high point on the cam 74 engages the end 73 of the lever arm 70. The parts will then reverse the direction of movement just described and the hook 68 of latch lever 65 will be moved downwardly so as to hold the carriage plate 17 lower and position the auxiliary heater 62 closer to the timing bimetal 43. This will cause heat to be transmitted to the timing bimetal 43 at a faster rate and accordingly shorten the toasting interval to produce light toast. Toast of any degree of brownness may be made by rotating the hand wheel 76 to any position intermediate those just described.

The operator having set the hand wheel 76 to make the toast desired, bread is inserted through the openings 13 and the hand knob 28 is moved to downward position which moves the bread carriers 15 and the carriage plate 17 downwardly against the bias of the spring 29.

The tang 54 will engage the cam 64 on the latch arm 65 to move it clockwise against the bias of spring 67 until the hook 68 overlies the tang 54 to latch the carriers 15 and the carriage plate 17 downwardly. The bimetal timer 43 being cold at this time it will be held in its upper over-center position by the compressive force of the spring

49. The end 51 of the bimetal timer 43 and correspondingly the contact 52 will be in the downward position. Movement of the carriage plate 17 downwardly will cause the lug 91 on carriage plate 17 to engage the lug 90 on the end of the switch arm 88 and pivot it clockwise as viewed in Fig. 4 against the bias of spring 87 so as to bring the contact 89 into engagement with contact 52 and energize both the main heaters 21 and the auxiliary heater 62.

The auxiliary heater 62 will also move downwardly with the carriage plate 17 to a position immediately overlying the bimetal timer 43. The toaster as a whole, including the compensating bimetal 58 being cold at this time the compensating bimetal 58 will be in its lower position, as shown in Fig. 1, so that the auxiliary carrier 56 will be in its lower position relative to the carriage plate 17. This will position the auxiliary heater 62 closer to the timing bimetal 43.

Heat from the main heaters will apply heat to the bread to perform the toasting function while heat from the auxiliary heater 62 will be applied to the timing bimetal 43 to slowly heat it and cause it to move downwardly toward its dead center position. By the time the bread is properly toasted the bimetal timer 43 will have reached its dead center position and snapped to its lower over-center position under the influence of the spring 49. This will cause the end 51 of the timer 43 to move upwardly and move the contact 52 away from the contact 89 to deenergize both the main heaters 21 and the auxiliary heater 62. At the same time the central portion of the bimetal timer 43 will move the latch release arm 82 downwardly. The cam 83, held by the spring 85 against the latch arm 65, moves the latch arm 65 clockwise against the bias of its spring 67 until the end 79 of the latch arm 65 engages the lower edge of the slot 27. This will release the hook 68 from above the tang 54 and release the carriage plate 17 for upward movement under the bias of the spring 29.

When the end 79 of the latch arm 65 engages the end of the slot 27 the impact produced by the snap movement of the bimetal timer 43 downwardly will cause the lower end of the latch release arm 82 to move to the left against the bias of the spring 85 by the action of the cam 83 on the latch arm 65. This will cause the cams 83 and 84 to move beneath the latch arm 65 whereby the spring 67 will return the latch arm 65 to its original position against the stop 66'.

If now a second toasting operation is desired immediately, new slices will be inserted through the openings 13 and the handle 28 moved to downward position. This will latch the carriage plate 17 downwardly as before because the latch arm 65 has returned to its original position. Movement of the carriage plate 17 downwardly will also move the switch arm 88 clockwise as before, but the contact 89 cannot engage the contact 52 because the end 51 of the bimetal timer 43 is in its upward position.

The bimetal timer 43 will then continue to cool until it moves upwardly past its dead center position when it will snap back to its upper over-center position under the force of the spring 49. It has been found that in practice the above action will occur a few seconds after the bimetal timer has moved to downward over-center position. Thus, whether or not the operator desires new toast immediately there will be no waiting for the bimetal timer to cool. The operator merely inserts new bread and moves the handle 28 downwardly and the new toast will be automatically ejected when properly done.

Movement of the central portion of the bimetal timer 43 upwardly will cause its end 51 to move downwardly and engage the contacts 52 and 89 to reenergize the main heaters 21 and the auxiliary heater 62. The central portion of the bimetal timer 43 will also engage the pin 81 and move the latch release arm 82 upwardly. Since the latch arm 65 is held against counter-clockwise movement by the stop 66' the cam 84 will merely ride over the latch arm 65 against the bias of spring 85 to again position the cam 83 above the arm 65 for the next releasing action.

Movement of the carriage plate 17 downwardly for the second toasting operation will also move the auxiliary heater 62 downwardly to a position immediately over the timing bimetal 43. However, since the toaster is hot at this time the compensating bimetal 58 will also be hot. This will cause the free end of the compensating bimetal to move upwardly and move the auxiliary carriage plate 56 upwardly relative to the carriage plate 17. This will cause the auxiliary heater to be positioned farther above the bimetal timer 43 than it was for the first toasting operation. This will cause heat to be transmitted from the auxiliary heater 62 to the bimetal timer 43 at a slower rate but since the bimetal timer 43 is also hot at this time it does not need as much heat as before to cause it to move to its lower over-center position. The amount of movement of the free end of the compensating bimetal 58 is just sufficient to compensate for the tendency of the timer 43 to time too fast as the toaster as a whole heats up with repeated use.

The operation will continue as before, the second operation being shorter than the first but not as short as it would be if the compensating bimetal 58 were not present. Eventually, if the toaster is repeatedly used in rapid succession, an equilibrium will be reached between the toaster as a whole, the timing bimetal 43 and the compensating bimetal 58 so that each following toasting operation will be of the same length as the one immediately preceeding it.

From the foregoing it can be seen that this invention provides a thermal timer for a toasting operation operating upon a heat-up principle of operation in which it is not necessary for the operator to wait to begin a second toasting operation immediately after the first. The bread carriers will be latched in toasting position whether or not the thermal timer has cooled, however, neither the main heaters nor the auxiliary heater will be energized until the timing bimetal has cooled sufficiently to properly time the succeeding toasting operation. Additionally, compensation is provided by moving the auxiliary heater relative to the toast carrier so as to move it toward and away from the thermal timer as the carriers are latched in toasting position. Also a manual adjustment is provided for moving the latch lever upwardly and downwardly relative to the thermal timer so that the auxiliary heater will be closer to or farther away from a thermal timer when the carriage plates are latched in toasting position. This latter is the adjustment for light, medium, or dark toast.

It can also be seen that a single switch is provided for both the main and auxiliary heaters which cannot become closed unless the thermal timer is cold and the carriers are in toasting position.

While we have shown but a single embodiment of our invention it is to be understood that this embodiment is to be taken as illustrative only and not in a limiting sense. We do not wish to be limited to the particular structure shown and described but to include all equivalent variations thereof except as limited by the scope of the claims.

We claim:

1. A toaster comprising, main heaters for performing the toasting function, carriers movable from receiving to toasting position adjacent said main heaters, a thermal timer for timing the duration of successive toasting intervals, an auxiliary heater carried by said carriers for applying heat to said thermal timer, said timer being so mounted that said auxiliary heater is moved into heating relation to said timer when said carriers are moved to toasting position, and thermal means carried by said carriers and positioned to be responsive to toaster temperature and connected to said auxiliary heater to change its position relative to said carriers with changes in toaster temperature to change the relative positions of said heater and thermal timer, said thermal means being operative to change the position of said heater relative to said timer prior to the initiation of and during a toasting interval with changes in toaster temperature.

2. A toaster comprising, a base, main heaters for performing the toasting function, bread carriers movable from receiving to toasting position adjacent said main heaters, a thermal timer mounted on said base, an auxiliary heater for said timer carried by said carriers in a position to be in heat transfer relationship to said timer when said carriers are moved to toasting position, said auxiliary heater being mounted for movement relative to said carriers so as to be positioned at varying positions relative to said timer when said carriers are in toasting position and thermally responsive means carried by said carriers and connected to said auxiliary heater to move it relative to said carriers responsive to changes in toaster temperature, said thermally responsive means being operative to move said heater relative to said carriers during a toasting interval whereby the position of said heater relative to said timer is changed during toasting intervals responsive to changes in toaster temperature during those toasting intervals.

3. A toaster according to claim 2 including manually actuatable means for changing the position of said carriers relative to said base in adjusting for light, medium, or dark toast whereby the position of said heater relative to said timer is changed when said carriers are moved to toasting position.

4. A toaster comprising, a base, main heaters for performing the toasting function, bread carriers movable from receiving to toasting position adjacent said main heaters, a thermal timer mounted on said base for timing the duration of toasting intervals, an auxiliary heater for said timer movably carried by said carriers so as to be movable relative thereto, said auxiliary heater being carried by said carriers in a position to be in heat exchange relationship to said timer when said carriers are in toasting position and out of heat transfer relationship therewith when said carriers are in receiving position, means for moving said carriers to toasting position, vertically movable latching means carried by said base and cooperating with means on said carriers to latch them in toasting position, manually actuatable means for varying the position of said latching means relative to said base to thereby vary the position of said heater relative to said timer and thermally responsive means operatively connected to said auxiliary heater for varying its position relative to said carriers to further vary the position of said auxiliary heater relative to said timer when said carriers are in toasting position.

5. A toaster comprising, a base, main heaters for performing the toasting function, bread carriers movable from receiving to toasting position adjacent said main heaters, a thermal timer mounted on said base for timing the duration of toasting intervals, an auxiliary heater for said timer movably carried by said carriers so as to be movable relative thereto and in a position to be in heat exchange relationship with said timer when said carriers are moved to toasting position, thermally responsive means operatively connected to said auxiliary heater for moving it relative to said carriers responsive to changes in toaster temperature, latching means for latching said carriers in toasting position and manually actuatable means cooperating with said latching means to vary the position of said carriers relative to said base when said carriers are in toasting position.

6. A toaster comprising, a base, bread carriers movable from receiving to toasting position, a thermal timer mounted on said base for timing the duration of toasting intervals, said timer having a cold over-center position, a dead center position and a hot over-center position, a heater carried by said carriers in a position to be in heat exchange relationhsip with said timer when said carriers are moved to toasting position, means for moving said carriers to toasting position, means for latching the carriers in toasting position, means actuated by movement of said carriers to toasting position for energizing said heater when said timer is in its cold over-center position to cause said timer to move to its hot over-center position in timing the duration of toasting intervals, thermally responsive means for moving said heater relative to said carriers with changes in toaster temperature to vary the position of said heater relative to said timer when said carriers are moved to toasting position to thereby vary the duration of toasting intervals with changes in toaster temperature, manually actuatable means to vary the position of said carriers relative to said base when said carriers are moved to toasting position to vary the position of said heater relative to said timer when said carriers are moved to toasting position to further vary the duration of toasting intervals in adjusting for light, medium, or dark toast and means actuated by movement of said timer to its hot over-center position for de-energizing said heater and relasing said latch means to release said carriers for movement to receiving position.

7. A toaster according to claim 6 in which movement of said timer to its hot over-center position conditions said latch means for the immediate latching of said carriers in toasting position prior to the movement of said timer to its cold over-center position.

8. A toaster according to claim 6 in which movement of said timer to its hot over-center position deenergizes said heater and conditions said latch means for the immediate latching of said carriers in toasting position while maintaining said heater deenergized until said timer returns to its cold over-center position.

9. A toaster comprising, a base, main heaters for performing the toasting function, a thermal timer mounted on said base for timing the duration of toasting intervals, said timer having a cold position and a hot position, bread carriers movable from receiving position to toasting position into heat exchange relationship with said main heaters, an auxiliary heater carried by said carriers in a position to be in heat exchange relationship with said timer when said carriers are moved to toasting position, means for moving said carriers to toasting position, means for latching said carriers in toasting position, means actuated by movement of said carriers to toasting position for energizing both of said heaters when said timer is in its cold position and inoperative to energize either of said heaters when said timer is in its hot position, thermally responsive means for moving said auxiliary heater relative to said carriers responsive to changes in toaster temperature to vary the heat exchange relationship between said auxiliary heater and said timer with changes in toaster temperature, means actuated by movement of said timer to its hot position for deenergizing both of said heaters and conditioning said latch means for immediate latching engagement with said carriers while maintaining said heaters deenergized and means conditioned by movement of said timer to its cold position for conditioning said energizing means for energizing both of said heaters when said carriers are again moved to toasting position.

10. A toaster according to claim 9 including manually actuatable means to move said latch means relative to said base to position said carriers varying distances from said base to thereby vary the heat exchange relationship between said heater and timer and thereby vary the duration of toasting intervals in adjusting for light, medium or dark toast.

11. A toaster comprising, a base, main heaters for performing the toasting function, a snap-acting bimetal timer mounted on said base for timing the duration of successive toasting intervals, said bimetal being supported between its ends by a pair of supports so as to occupy an upper over-center position when cold and a lower over-center position when hot and said bimetal having an extension extending beyond one of said supports, an electrical contact carried by the free end of said extension, bread carriers movable from receiving to toasting position adjacent said main heaters, means for moving said carriers to toasting position, means for latching said carriers in toasting position when said timer is in its upper or lower positions, an auxiliary heater for said timer, a switch arm pivotally mounted on said base between its ends so that one of its ends is positioned beneath a portion of said carriers and its other end is positioned beneath the free end of the extension of said bimetal and an electrical contact carried by the last mentioned end of said switch arm, said switch arm being biased to move said contacts away from each other, said contacts being connected in series with said main and auxiliary heaters, the arrangement being such that movement of said carriers to toasting position will pivot said switch arm to move said contacts toward each other whereby the contacts will be closed only when said timer is in its upper over-center position and its extension is in its lower position and said carriers are in toasting position.

12. A toaster comprising, a base, main heaters for performing the toasting function, a snap-acting thermal timer mounted on said base for timing the duration of successive toasting intervals, said timer having a cold over-center position and a hot over-center position and having an extension to one of its ends which moves in the opposite direction from the central portion of said timer, an electrical contact carried by said extension, a heater for said timer, bread carriers movable from receiving to toasting position adjacent said main heaters, means for moving said carriers in toasting position, means for latching said carriers in toasting position when said timer is in either of its over-center positions, a switch arm movably carried by said base including an electrical contact connected in series with the contact carried by said extension and in series with said heaters, said switch arm being positioned to be actuated by movement of said carriers to toasting position to move said contacts toward each other, the arrangement being such that said contacts are closed only when said timer is in its cold over-center position and said carriers are in toasting position.

13. A toaster comprising, a base, main heaters for performing the toasting function, bread carriers movable from receiving to toasting position adjacent said main heaters, a thermal timer mounted on said base for timing the duration of toasting intervals, a heater for said timer carried by said carriers, the arrangement being such that said heater is positioned in heat exchange relationship to said timer when said carriers are in toasting position and out of heat exchange relationship thereto when said carriers are in receiving position, means for moving said carriers to toasting position, vertically adjustable latch means for latching said carriers in toasting position and manually actuatable means for varying the vertical position of said latching means relative to said base to thereby vary the position of said heater relative to said timer when said carriers are latched in toasting position.

14. A toaster according to claim 13 including thermally responsive means operatively connected to said heater and operative to further vary its position relative to said timer when said carriers are latched in toasting position.

15. A toaster comprising, a base, main heaters for performing the toasting function, a thermal timer mounted on said base for timing the duration of successive toasting intervals, said timer comprising a snap-acting bimetal having a cold over-center position and a hot over-center position, bread carriers movable from receiving to toasting position adjacent said main heaters, means for latching said carriers in toasting position when said timer is in either of its over-center positions, an auxiliary heater for said timer, an electrical contact carried by said timer so as to be oscillated by movement of said timer to its opposite over-center positions, a switch arm movably mounted on said base, an electrical contact carried by the end of said switch arm and positioned to be contacted by the contact carried by said timer, said contacts being connected in series with said heaters, means for moving said carriers to toasting position, said switch arm being positioned to be actuated by movement of said carriers to toasting position to move its contact toward the contact carried by said timer, the arrangement being such that said contacts are in contact with each other so as to energize said heaters only when said carriers are in toasting position and said timer is in its cold position.

WARREN A. HUMPHREY.
OTIS B. SUTTON.

REFERENCES CITED

The following references are of record in the file of this patent:

UNITED STATES PATENTS

| Number | Name | Date |
|---|---|---|
| 2,101,062 | Graham | Dec. 7, 1937 |
| 2,106,269 | Brosseau et al. | Jan. 25, 1938 |
| 2,112,422 | McCullough et al. | Mar. 29, 1938 |
| 2,196,394 | Ireland | Apr. 9, 1940 |
| 2,234,764 | Ireland | Mar. 11, 1941 |
| 2,250,979 | Winborne | July 29, 1941 |
| 2,254,946 | Ireland | Sept. 2, 1941 |
| 2,269,162 | Newell | Jan. 6, 1942 |
| 2,271,485 | Koci | Jan. 27, 1942 |
| 2,342,461 | Ettinger et al. | Feb. 22, 1944 |
| 2,426,620 | Koci | Sept. 2, 1947 |
| 2,436,735 | Walder | Feb. 24, 1948 |